(12) United States Patent
Iwahara et al.

(10) Patent No.: US 9,284,974 B2
(45) Date of Patent: Mar. 15, 2016

(54) CLIP

(71) Applicant: Daiwa Kasei Industry Co., Ltd., Aichi (JP)

(72) Inventors: Toshio Iwahara, Aichi (JP); Makoto Kato, Aichi (JP); Atsutoshi Kaji, Aichi (JP)

(73) Assignee: DAIWA KASEI INDUSTRY CO., LTD., Okazaki-Shi, Aichi (JP)

( * ) Notice: Subject to any disclaimer, the term of this patent is extended or adjusted under 35 U.S.C. 154(b) by 40 days.

(21) Appl. No.: 14/259,421

(22) Filed: Apr. 23, 2014

(65) Prior Publication Data

US 2014/0321936 A1 Oct. 30, 2014

(30) Foreign Application Priority Data

Apr. 25, 2013 (JP) .................................. 2013-092898

(51) Int. Cl.
*F16B 37/08* (2006.01)
*F16B 39/28* (2006.01)

(52) U.S. Cl.
CPC .............. *F16B 39/28* (2013.01); *F16B 37/0857* (2013.01)

(58) Field of Classification Search
CPC ............................ F16B 37/08; F16B 37/0857
USPC ................................................. 411/437, 433
See application file for complete search history.

(56) References Cited

U.S. PATENT DOCUMENTS

| 781,571 | A | * | 1/1905 | Thomas | 411/437 |
| 4,600,344 | A | * | 7/1986 | Sutenbach et al. | 411/435 |
| 5,074,731 | A | * | 12/1991 | Schneider | 411/437 |
| 5,944,467 | A | * | 8/1999 | Yuta | 411/433 |
| 8,328,488 | B2 | * | 12/2012 | Luk | 411/437 |

FOREIGN PATENT DOCUMENTS

| JP | 11-141528 | 5/1999 |
| WO | 2009014817 A2 | 1/2009 |

OTHER PUBLICATIONS

European Search Report mailed Jul. 29, 2014 for Application No. 14165795.7-1758.
English translation of JP 11-141528 filed May 25, 1999.

* cited by examiner

*Primary Examiner* — Flemming Saether
(74) *Attorney, Agent, or Firm* — Thomas | Horstemeyer, LLP (57) ABSTRACT

In a clip that copes with pitches of a plurality of types of screw grooves, force to support the engaged screw members is increased at low cost. The clip includes opposite elastic locking pieces. Each elastic locking piece extends from a first side to a second side opposite to the first side, in the direction of the axis of the screw member such that its leading end approaches the screw member within the insertion hole of a tubular body part. Each elastic locking piece is elastically deformable such that its leading end is separated from the screw member. Each locking piece has at its leading end a locking claw that engages with the screw groove of the screw member. The first side of the locking claw has a straight section extending straight, and the second side opposite to the first side has a helical section extending helically along the groove.

4 Claims, 8 Drawing Sheets

CLIP

RELATED APPLICATIONS

This application claims the priority of Japanese Patent Application No. 2013-092898 filed on Apr. 25, 2013. The disclosure of the prior application is hereby incorporated herein in the entirety by reference.

BACKGROUND OF THE INVENTION

1. Field of the Invention

The invention relates to a clip that is attached to a member to be mounted (for example, a plate or the like, especially, a cover such as an undercover for a vehicle) and that brings a screw member into an engaged state by insertion of the screw member into an insertion hole formed in the clip.

2. Description of the Related Art

For example, it has been found that mounting an undercover (a member to be mounted) on the underside of a vehicle body (a target member on which the undercover is mounted) improves the aerodynamic performance of the vehicle and hence the fuel efficiency thereof. Specifically, a cylindrical clip made of synthetic resin is attached to the undercover, a screw member extending upward from the vehicle body is engaged with the clip, and thus the undercover is attached to the vehicle body. Such a clip includes a tubular body part with an insertion hole for the screw member, and elastic locking pieces. The elastic locking pieces are located in predetermined opposite areas on the inner periphery of the insertion hole with the axis of the screw member, inserted into the insertion hole, between them. The elastic locking pieces extend from a first side in the axial direction of the inserted screw member to a second side in the axial direction thereof, which is opposite to the first side, such that the leading end of each elastic locking piece approaches and engages with the screw member. Each elastic locking piece is elastically deformable so that its leading end separates from the screw member.

Some of these clips are engageable with a plurality of types of screw members different in screw groove pitch as described, for example, in Patent Document 1. Specifically, in such a clip, each of the opposite elastic locking pieces as described above has, at its leading end, engaging claws that engage with a helical screw groove in the outer periphery of the screw member, and the engaging claws are formed such that even where at least two or more types of screw members respectively different in screw groove pitch are inserted into the insertion hole of the tubular body part, the engaging claws are engageable with the screw groove of the screw member.

However, in a clip formed so as to cope with the respective pitches of a plurality of types of screw grooves, there is a demand to further improve the load that is able to be supported by the clip's engagement with each of the respective grooves of those screws. That is, such a clip is formed so as to match the respective predetermined pitches of a plurality of screw grooves. Therefore, if a screw member is used, engagement with which is slightly off, supporting force in the axial direction for the screw member resulting from engagement may decrease. To improve the supporting force, a change to a more expensive material may be proposed. However, a cost increase is not desirable.

RELATED ARTS DOCUMENTS

[Patent Document]

[Patent Document 1] JP H11-141528 A

SUMMARY OF THE INVENTION

It is therefore an object of the invention to increase, at low cost, supporting force to support an engaged screw member, in a clip formed, in particular, so as to cope with the respective pitches of a plurality of types of screw grooves.

In order to achieve the foregoing object, a clip according to the invention includes a tubular body part with an insertion hole, and elastic locking pieces which are opposite to each other. The elastic locking pieces are located on the inner periphery surface of the insertion hole and on predetermined opposite areas with the axis of a screw member, inserted into the insertion hole, between them. Each elastic locking piece extends from a first side to a second side, which is opposite to the first side, in the direction of the axis such that the leading end of the elastic locking piece approaches the screw member. Each elastic locking piece is elastically deformable so that the leading end separates from the screw member. Each of the opposite elastic locking pieces has at the leading end a locking claw that engages with a helical screw groove on outer periphery of the screw member. The locking claws are formed such that even where two or more types of screw members different in pitch of the screw groove are inserted into the insertion hole, the locking claws are engageable with the screw groove. In this clip, each locking claw includes a straight claw portion in which a claw leading-edge extends straight in a direction orthogonal to the axis, and a helical claw portion extending helically along the screw groove of the screw member so as to be continuous from the straight claw portion.

Specifically, if it is assumed that a circle drawn passing through passage points on the screw groove of the screw member inserted into the insertion hole has, as its center, the axis and has, as its radial direction, the direction in which the elastic locking pieces are opposite to each other, which direction is orthogonal to the axis, a claw leading-edge of each locking claw has a straight section extending straight along a line tangential to the circle, which passes through the passage points, on a first side in the direction of the tangential line, and also has a helical section helically extending along the screw groove of the screw member, the helical section continuing from the straight section to the a second side, which is opposite to the first side, in the tangential direction.

In the configuration of this invention, unlike a conventional straight locking claw, each claw leading-edge is formed with the straight section and the helical section along the screw groove. In a straight locking claw as in a conventional one, the area of contact with a screw thread is small. However, in the invention, the helical section following the screw groove is provided, greatly increasing the area of contact with a screw thread, thus increasing supporting force to support the screw member in its axial direction. Additionally, the straight section is formed on one side, and the helical section is formed on the other side. Accordingly, a mold can be set in a simple shape.

The locking claw is formed such that the edge of the helical section extends longer than the edge of the straight section in circumferential direction of the insertion hole around the axis, thus lengthening the engagement section where the locking claw engages with the screw groove. In this configuration, the helical section where the area of contact with the screw thread increases is extended. Accordingly, supporting force to support the screw member in its axial direction is further increased.

Two elastic locking pieces that are opposite to each other in the radial direction can be formed such that each of the locking claws has the straight section and helical section on the first side and second side, respectively, in circumferential direction of the insertion hole around the axis. In this configuration, the area of contact with the locking claw is rendered uniform in the circumferential direction around the axis of the screw member. Accordingly, the screw member can be supported in a balanced manner.

The invention is also applicable to a clip in which locking claws are formed so as to engage with one type of screw member.

DESCRIPTION OF THE EMBODIMENTS

Referring to the drawings, the embodiments of the invention will be described below.

Figure 6:
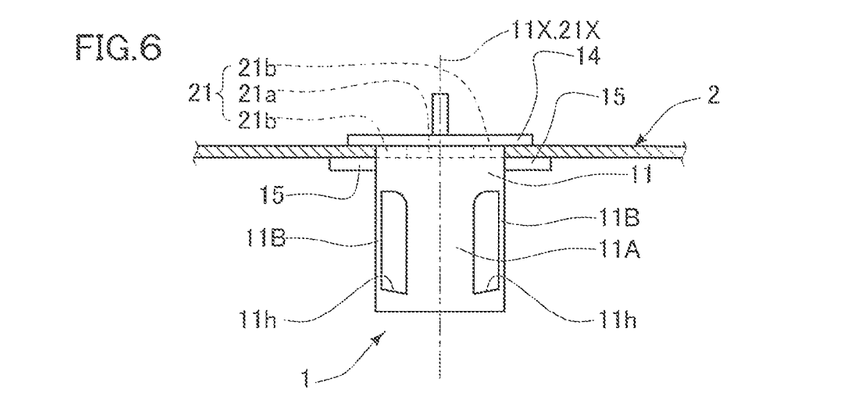
FIG. 6 is a view illustrating the state in which the clip in FIG. 5 is rotated and attached to the member to be mounted.
Figure 7:
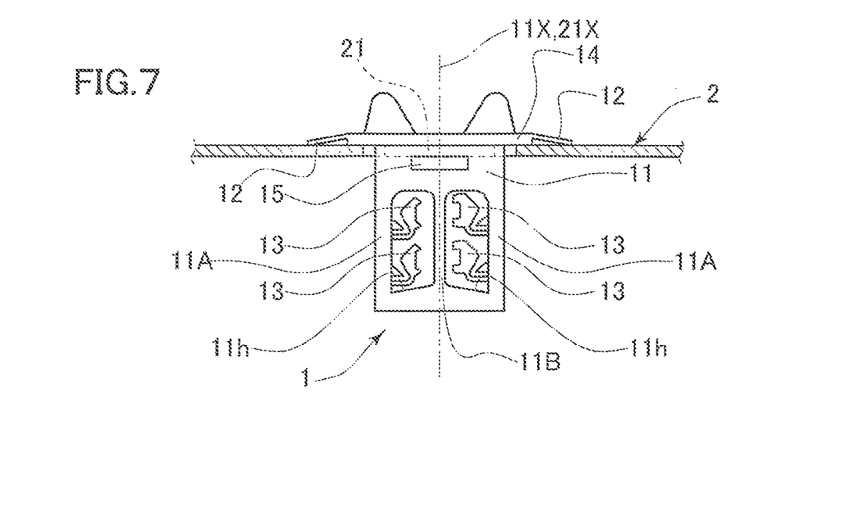
FIG. 7 is a view illustrating the state in which the clip is attached to the member to be mounted, which is viewed from the front side of the clip in FIG. 6.

A clip 1 according to the embodiment is attached to, for example, an undercover 2 (a member to be mounted) for a vehicle (see FIGS. 6 and 7). The clip 1 is a vehicle clip used for mounting the undercover 2 on a vehicle body 3 (a target member on which the undercover 2 is mounted) (see FIGS. 8 and 9).

Figure 1:
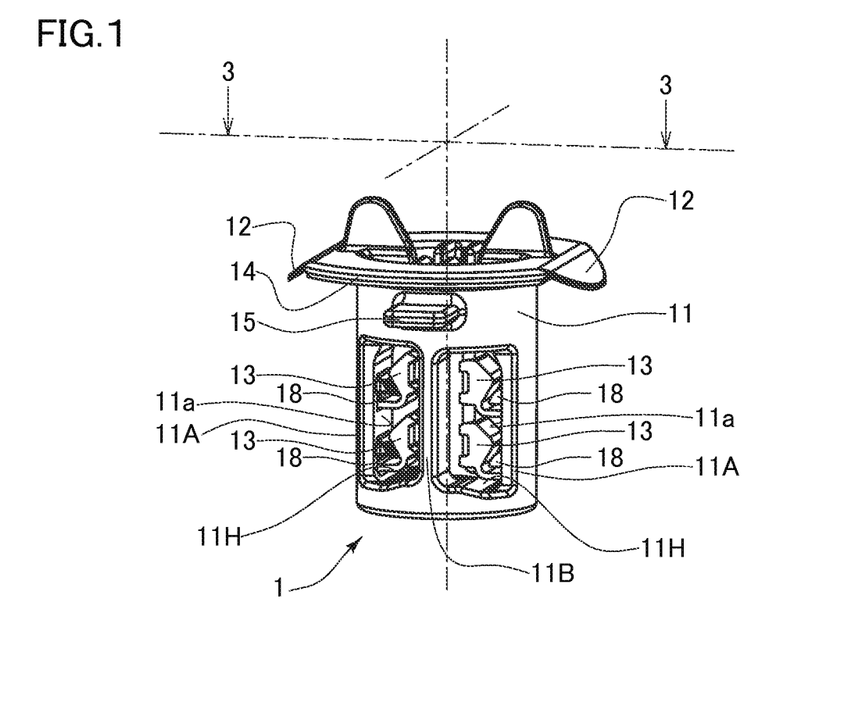
FIG. 1 is a perspective view of one embodiment of a clip according to the invention.
Figure 2:
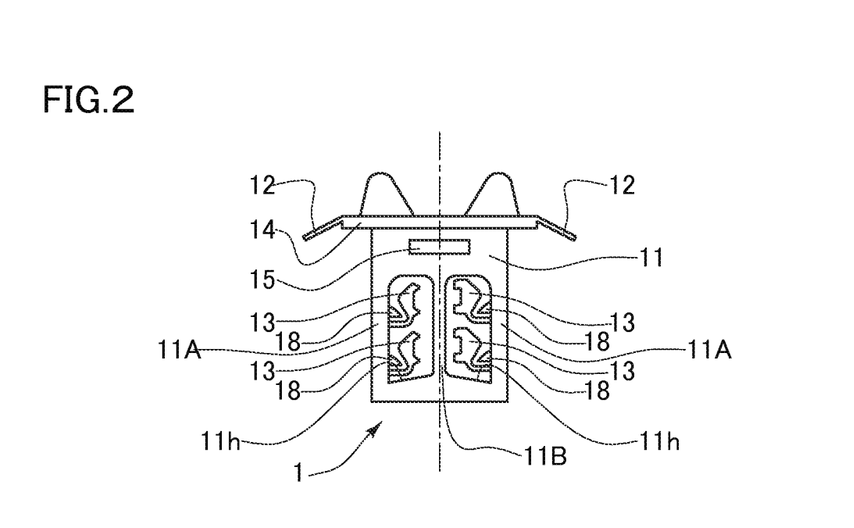
FIG. 2 is a schematic front view of the clip in FIG. 1.
Figure 3:
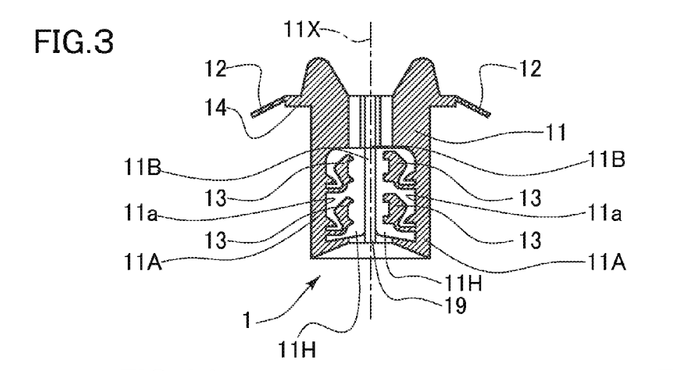
FIG. 3 is a schematic cross-sectional view taken along the line 3-3 in FIG. 1.

As shown in FIGS. 1 to 3, the clip 1 is a resin injection-molded body, which is integrally molded so as to include: a tubular hub 11 forming a tubular body part (in this embodiment, cylindrical); a plurality of elastic flaps 12 (in this embodiment, one pair of elastic flaps 12 symmetrical with respect to the axis of the hub 11); a plurality of elastic locking pieces 13 (in this embodiment, a total of four elastic locking pieces, i.e., two pairs of elastic locking pieces 13 symmetrical with respect to the axis of the hub 11): a flange 14 connected to the upper end (or the lower end) of the hub 11; and a plurality of locking parts 15 (in this embodiment, one pair of locking parts 15 symmetrical with respect to the axis of the hub 11) located lower (or higher) than the flange 14, and projecting outward from the outer periphery of the hub 11. The clip 1 here is integrally molded from synthetic resin (in this embodiment, polyacetal (POM)).

Figure 4A:
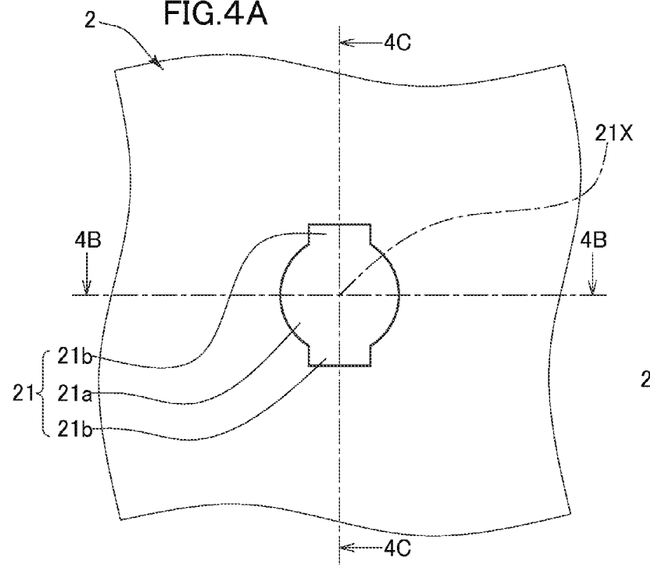
FIG. 4A is a plan view of an example of a member to be mounted, to which the clip in FIG. 2 is attachable.
Figure 4B:
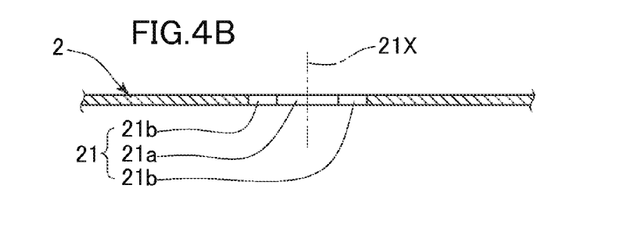
FIG. 4B is a cross-sectional view taken along the line 4B-4B in FIG. 4A.
Figure 4C:
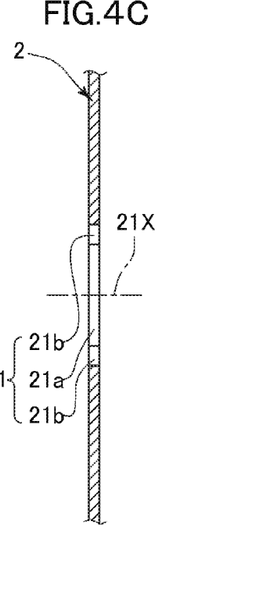
FIG. 4C is a cross-sectional view taken along the line 4C-4C in FIG. 4A.
Figure 8:
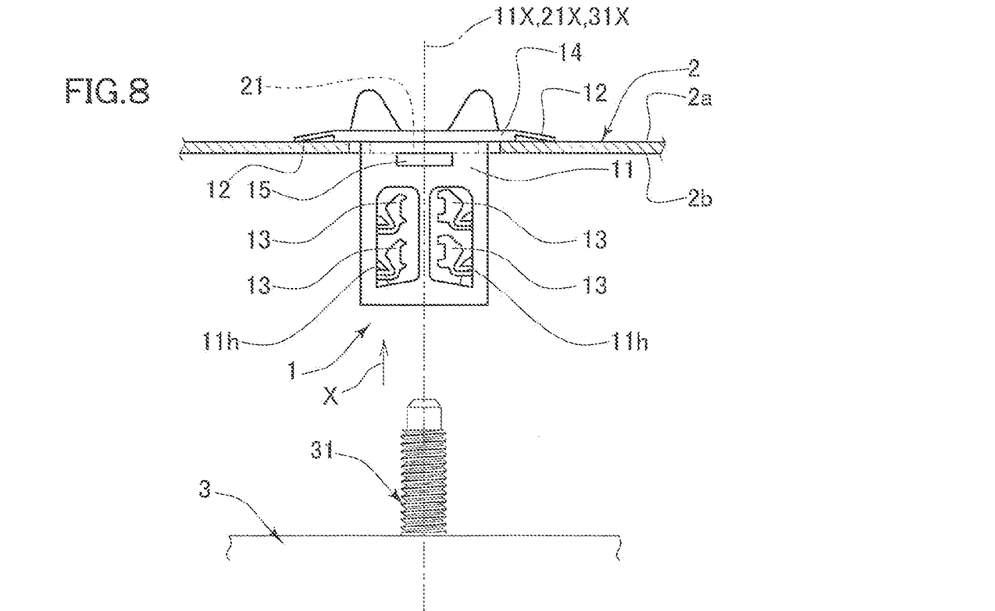
FIG. 8 is a view illustrating a method for insertion-fitting a screw member to the clip in FIG. 7.

As shown in FIGS. 4A to 4C, the undercover 2 has an insertion hole 21 into which the hub 11 can be inserted. As shown in FIG. 8, a stud bolt 31 (male screw part: screw member) is fixed in a vehicle 3. The stud bolt 31 can be inserted into an insertion hole 19 (in this embodiment, through-hole: see FIG. 3) formed on the same axis as an axis 11X of the hub 11.

A method for attaching the clip 1 to the undercover 2 will now be described.

Figure 5:
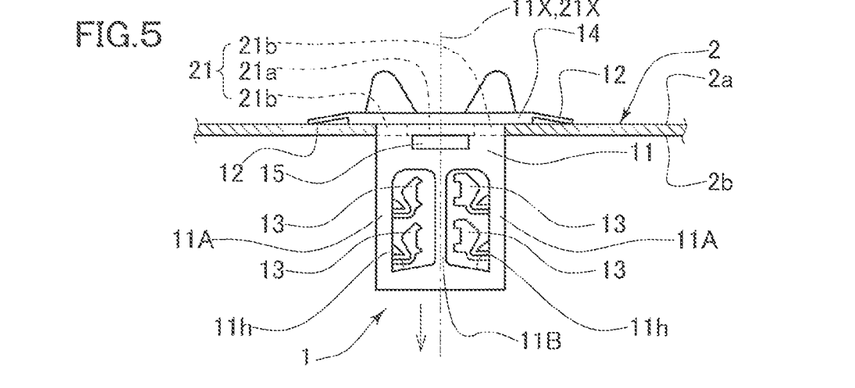
FIG. 5 is a view illustrating the state in which the clip in FIG. 2 is inserted in the member to be mounted in FIG. 4A.

First, as shown in FIG. 5, the hub 11 of the clip 1 is inserted into the insertion hole 21 formed in the undercover 2. The insertion hole 21 of this embodiment has a keyhole shape (see FIGS. 4A to 4C) of a combination of a hole portion 21a (in this embodiment, a circular hole) through which the hub 11 is inserted, and hole portions 21b (in this embodiment, rectangular holes, but circular holes may be used) through which the locking parts 15 are inserted, one for each. This insertion hole 21 may have another shape. The clip 1 is inserted into the insertion hole 21 in insertion direction (in the direction of the arrow in FIG. 5) while the axis 11X of the hub 11 and an axis 21X of the insertion hole 21 (hole portion 21a) coincide with each other and the locking parts 15 are disposed in places where the these parts 15 can be inserted through the hole portions 21b. Then, the flange 14 is brought into contact with the surface 2a of the undercover 2 by elastically deforming the elastic flaps 12 in insertion direction so as to press the respective leading edge sides of the elastic flaps 12 against the surface 2a. Consequently, the locking parts 15 reach the back 2b of the undercover 2.

Next, as shown in FIG. 6, the locking parts 15 are brought into contact with the back 2b of the undercover 2 by rotating the clip 1 around the axis 11X (in this embodiment, 90 degrees). Consequently, as shown in FIGS. 6 and 7, the undercover 2 is sandwiched between the flange 14 and the locking part 15 from both the surface and back of the undercover 2 and, additionally, the undercover 2 is pressure-sandwiched by pressing the elastic flaps 12 against the undercover 2. Thus, attachment of the clip 1 to the undercover 2 is completed.

It should be understood that the clip 1 may be attached to the undercover 2 by using another method.

Next, a description will be given of the elastic locking pieces 13 and locking claws 13V of the invention.

As shown in FIGS. 9 and 10, and FIGS. 11A to 11D, the elastic locking pieces 13 are located on the inner periphery 11a of the insertion hole 19 of the hub 11 and on predetermined opposite areas 11a (see FIG. 3) with the axis 31X of the stud bolt 31, inserted into the insertion hole 19, between them. The elastic locking pieces 13 extend from a first side to a second side, which is opposite to the first side, in the direction of the axis 11X such that its leading end portion 13A is closer to the stud bolt 31. That is, the elastic locking pieces 13 are elastically deformable parts that are opposite to each other with the axis 11X between them, such that the leading end portions 13A are separated from the stud bolt 31. The inner periphery 11a of the insertion hole 19 of the hub 11 has projections 18 (see FIGS. 1 and 2) serving as deformation restriction parts, which restrict the excessive elastic deformation of the leading end portion 13A of the elastic locking pieces 13. These projections 18 are located closer to base end portions 13B (see FIG. 10) than the leading end portions 13A.

Figure 9:
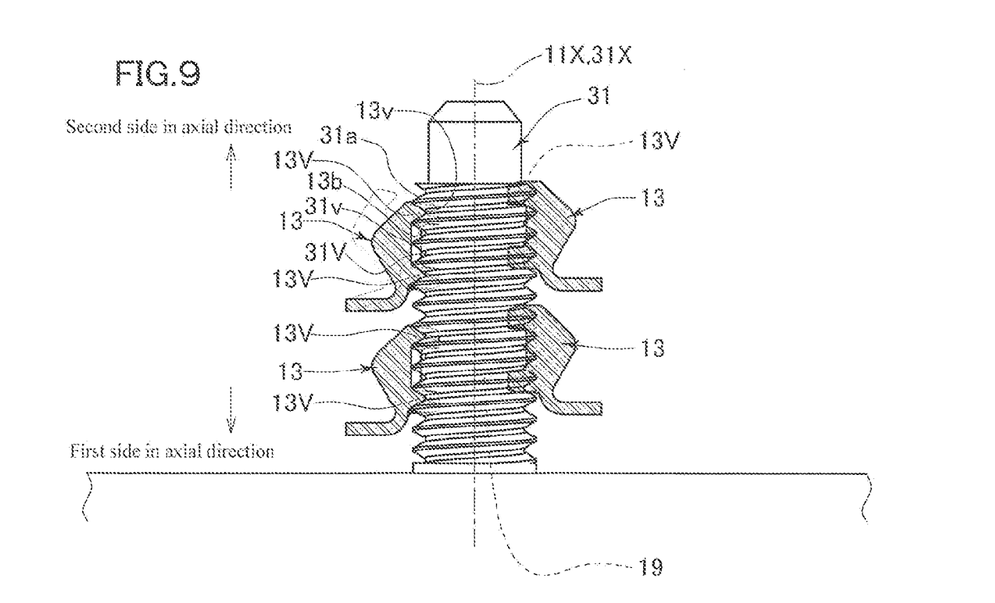
FIG. 9 is a view illustrating the engagement state in which the locking claws of the clip in FIG. 2 are locked in the screw groove of the screw member, which shows the screw member in FIG. 8 and elastic locking pieces of the same cross-section as that in FIG. 3.
Figure 10:
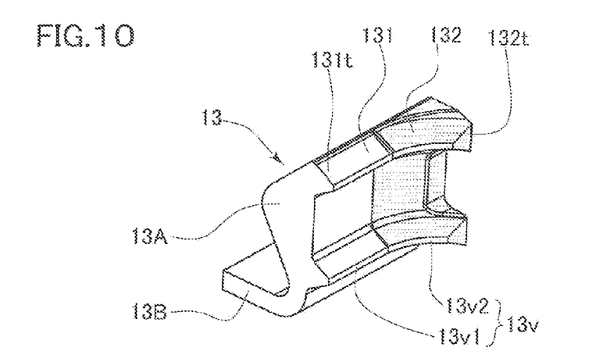
FIG. 10 is a perspective view of the elastic locking piece in FIG. 1.

The respective leading end portions 13A of the opposite elastic locking pieces 13 have locking claws 13V that engage with the helical screw groove 31V of the outer periphery of the stud bolt 31 inserted into the insertion hole 19. In this embodiment, the locking claws 13V are formed such that even where two or more types of stud bolts 31 respectively different in the pitch of screw groove 31V are inserted into the insertion hole 19, these locking claws 13V engage with the screw groove 31V.

In this embodiment, opposite elastic locking pieces 13 are grouped into an elastic locking piece group consisting of one or more elastic locking pieces 13 located on one side, and another elastic locking piece group consisting of one or more elastic locking pieces 13 located on the other side opposite the one side. Each elastic locking piece group has a locking claw group consisting of two or more (in this embodiment, four) locking claws 13V in the axial direction 11X. Either one of the pairs of adjacent locking claws 13V of each elastic locking piece group is a pair that sandwiches two or more screw threads 31v (that is, one or more screw grooves 31V). Formed between each pair of adjacent locking claws 13V is a recess 13 for accommodating two or more screw threads 31v of the stud bolt 31 (that is, one or more screw grooves 31V).

When each of the elastic locking piece groups has three or more locking claws 13V, the group may include a combination of pairs of adjacent locking claws 13V, which pairs are different in pitch between the adjacent claw leading-edges.

Additionally, when each of the elastic locking pieces 13 has three or more locking claws 13V, each piece 13 may include a combination of pairs of adjacent locking claws 13V, which pairs are different in pitch between adjacent claw leading-edges.

A method for attaching the stud bolt 31 (in this embodiment, the vehicle 3) to the clip 1 will now be described.

The stud bolt 31 projecting so as to extend from the vehicle body 3 is inserted from the first side to the second side in the direction of the axes 11X and 31X (in insertion direction X in FIG. 8) while the axis 31X of the stud bolt 31 and the axis 11X of the clip 1 are kept coincident with each other. At this time, an inclining face 31a of the screw thread 31v of the stud bolt 31 on the second side in the axial direction thereof presses an inclining face 13b of the locking claw 13V from the first side toward the second side in this axial direction. Consequently, the elastic locking piece 13 elastically deforms in the direction in which the locking piece 13 separates from the stud bolt 31. When the screw thread 31v of the stud bolt 31 is moved over the locking claw 13V, the degree of deformation of the locking claw 13V is maximum. After moving over, the locking claw 13V approaches the stud bolt 31 by elastically returning to its original shape. By repeating this action, the stud bolt 31 can be inserted into the insertion hole 19 of the clip 1 without being rotated around the axis 31X (See FIG. 9).

The stud bolt 31 which is in the engaged state as a result of being inserted into the insertion hole 19 of the clip 1 as described above and then being locked by the locking claws 13v cannot be pulled out in direction opposite to the insertion direction since elastic deformation cannot be applied to the elastic locking piece 13 in the direction in which it separates from the stud bolt 31.

Next, the main characteristic parts of the invention will be described.

As shown in FIG. 10, around the axis 11X of the hub (the axis 31X of the stud bolt 31), each locking claw 13V has a straight claw portion 131 in which a claw leading-edge 13v1 extends straight in a direction orthogonal to the axes 11X and 31X, and a helical claw portion 132 extending along the helical screw groove 31V of the stud bolt 31 inserted into the insertion hole 19. The locking claw 13V has a shape such that the straight claw portion 131 and the helical claw portion 132 are continuously connected laterally. A claw leading-edge 13v2 of the helical claw portion 132 changes its position in the direction of the axes 11X and 31X while following the screw groove 31V.

Figures 11B, 11C, 11D:
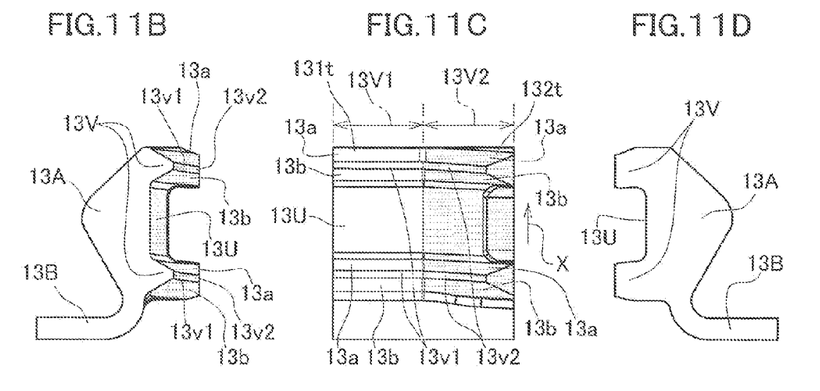
FIG. 11B is a front view of the elastic locking piece in FIG. 10.
FIG. 11C is a side view of the inner periphery of the elastic locking piece in FIG. 10, as viewed outward from the inner periphery side thereof.
FIG. 11D is a rear view of the elastic locking piece in FIG. 10.
Figure 12:
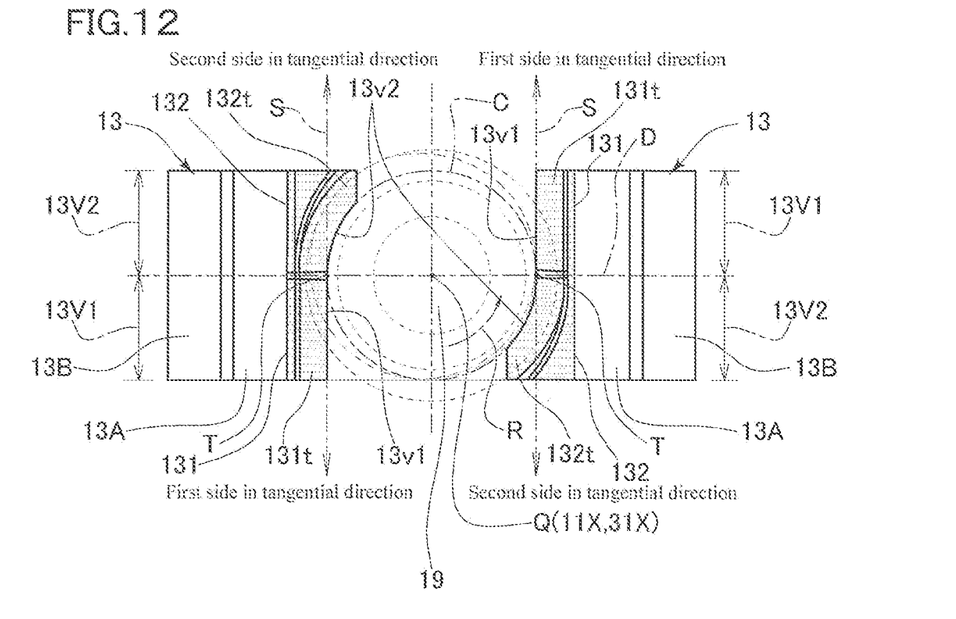
FIG. 12 is a plan view in FIG. 9, in which a screw member is indicated by the broken lines.

In this embodiment, as shown in FIG. 12, it is assumed that a circle C drawn passing through passage points T on the screw groove 31V of the stud bolt 31 inserted into the insertion hole 19 has, as its center Q, the axes 11X and 31X and also has, as its radial direction, the direction D in which the elastic locking pieces 13 are opposite to each other, which direction D is orthogonal to the axes 11X and 31X. In this case, a claw leading-edge 13v of each locking claw 13V has: a straight section 13V1 (the claw leading-edge 13v1 of this section) extending straight along a line S tangential to the circle C, which passes through the passage points T, on one side in the direction of extension of the tangential line S, (hereinafter, referred to as the tangential direction) (on the first side in the tangential direction: in this embodiment, this first side may be called a first side in a predetermined circumferential direction R around the axes 11X and 31X); and a helical section 13V2 (the claw leading-edge 13v2 of this section) helically extending along the screw groove 31V of the stud bolt 31, the helical section 13V2 continuing from the straight section 13V1 to the other side in the tangential direction, which is opposite to the one side (the second side in the tangential direction: in this embodiment, this second side may be called a second side in the predetermined circumferential direction R). In each locking claw 13, each of the inclining surfaces 13a and 13b, having a predetermined width outwards in the radial direction D from the claw leading-edge 13v and continuing to the helical section 13V2 from the straight section 13V1, also extends around the axis 11X of the hub 11 (the axis 31X of the stud bolt 31) in the same manner as the claw leading-edge 13v (see FIGS. 11B, 11C).

Additionally, each locking claw 13V in this embodiment is formed such that an edge 132t of each helical section 13V2 extends longer than an edge 131t of each straight section 13V1 in circumferential direction R of the insertion hole 19 around the axis thereof, thus lengthening the engagement section (contact section) where the locking claw 13V engages with (comes into contact with) the screw groove 31V. That is, the edge 132t of the helical section 13V2 of the locking claw 13V is formed so as to project toward the axes 11X and 31X beyond the edge 131t of the straight section 13V1 in the direction D in which the elastic locking pieces 13 are opposite to each other (see FIG. 10).

In this embodiment, locking claws 13V having the straight sections 13V1 and helical sections 13V2 are arranged opposite to each other. However, the opposite straight sections 13V1 of each pair are parallel to each other. The hub 11 has through-holes 11H (see FIG. 1) formed such that openings 11h are formed on both sides in the tangential direction (the penetrating direction) orthogonal to both the direction of the axis 11X and the direction D in which the elastic locking pieces 13 are opposite to each other (the radial direction). The through-holes 11H have respective elastic locking pieces 13 inside and communicate with the central part of the insertion hole 19 so as to be orthogonal to this central part. Additionally, among the external surfaces of the elastic locking pieces 13 and the projections 18 located inside the hub 11, all surfaces facing the one side in the tangential direction (the upper side in FIG. 12) are formed so as to be opposite to the open area of the opening 11h on the one side in the tangential direction. All surfaces facing the other side (the lower side in FIG. 12) in the tangential direction are formed so as to face the open areas of the opening 11h on the other side in the tangential direction. Thus, when injection molding is performed, the elastic locking pieces 13 and the projections 18 can be molded by molds arranged so as to form the openings 11h and pulled out toward the one side and the other side in the tangential direction.

The through-holes 11H are formed on both sides with an outer peripheral wall 11B of the hub 11 between them in the opposite direction D. The inner periphery surface of the outer peripheral wall 11B of the hub 11 defines the inner periphery surface of the insertion hole 19, and the outer peripheral wall 11B functions as a reinforcement wall to compensate for any loss of strength due to the through-holes 11H formed on both the sides. On the other hand, formed outside both the through-holes 11H in the circumferential direction R are outer peripheral walls 11A of the hub 11 having the opposite areas 11a where the elastic locking pieces 13 are formed on their respective inner peripheries.

While one embodiment of the invention has been described for the purpose of illustration, it should be understood that the invention is not limited thereto and that various modifications such as additions or omissions can be made by those skilled in that art without departing from the spirit of the scope determined by the appended claims. Modified examples of the embodiment described above will be explained below. In the descriptions below, parts having the same functions as those in the embodiment above are labelled with the same signs as in the embodiment and a description thereof will be omitted. The embodiment above and the modified examples below may be combined as needed within the scope where no technical inconsistency arises.

The above description is of a case where the undercover 2 for a vehicle serves as a member to be mounted and the vehicle body 3 serves as a target member on which the undercover 2 is mounted. However, the clip 1 according to the invention may be used in other applications. The stud bolt 31 may be another member as long as it is a shaft-like member formed as a male screw part.

Figure 11A:
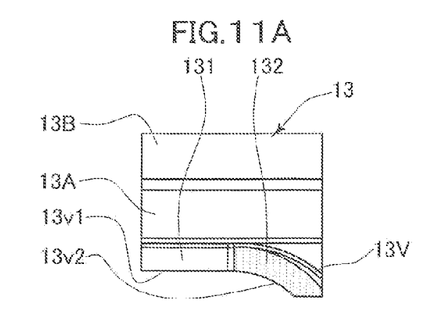
FIG. 11A is a plan view of the elastic locking piece in FIG. 10.
Figure 13:
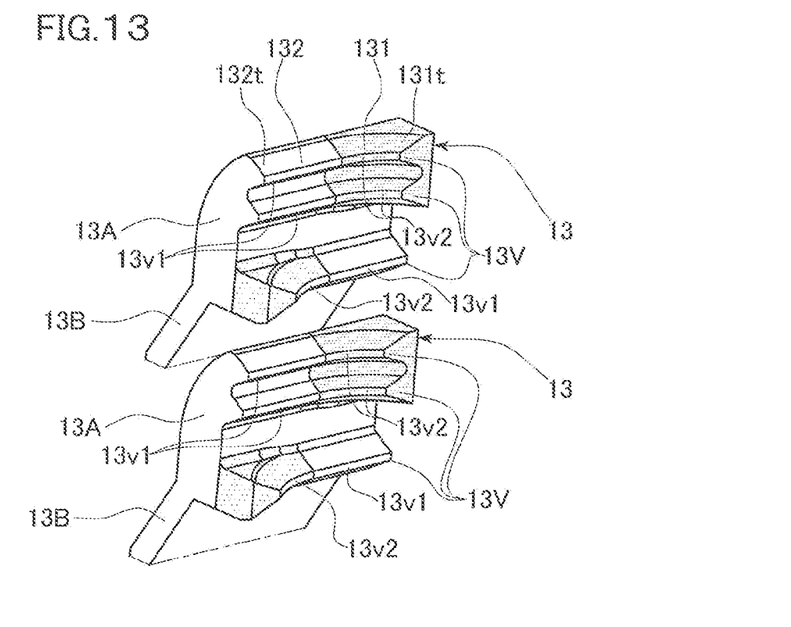
FIG. 13 is a perspective view of an elastic locking piece similar to that in FIG. 10, showing a first modified example of the clip in FIG. 1.

In the embodiment described above, each claw leading-edge 13v of each locking claw 13V is formed with the straight section 13V1 (claw leading-edge 13v1) and the helical section 13V2 (claw leading-edge 13v2) (see FIGS. 10 to 12). In all the locking claws 13V located adjacent to one another in the direction of the axis 11X, the straight sections 13V1 (claw leading-edges 13v1) are located on the first side in the predetermined circumferential direction R, and the helical sections 13V2 (claw leading-edges 13v2) are located on the second side in the predetermined circumferential direction R (the direction opposite to the arrow R in FIG. 12). However, as shown in FIG. 13, the locking claws 13V located adjacent to one another in the direction of the axis 11X may be a combination of locking claws 13V different in the respective sides where the straight section 13V1 (claw leading edge 13v1) and helical section 13V2 (claw leading-edge 13v2) are located in the predetermined circumferential direction R.

Figure 14:
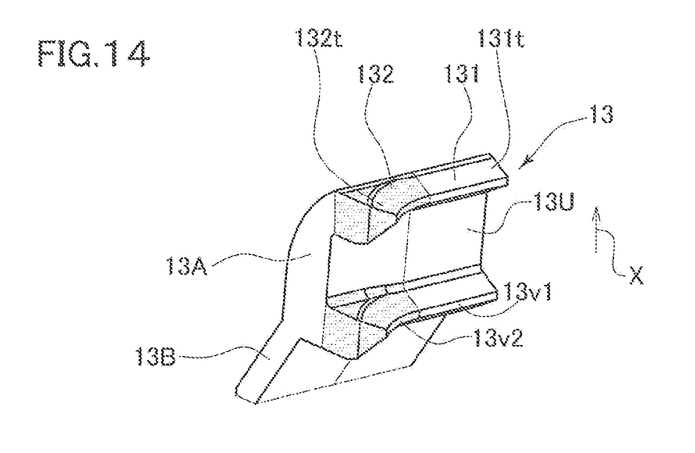
FIG. 14 is a perspective view of an elastic locking piece similar to that in FIG. 10, showing a second modified example of the clip in FIG. 1.
Figure 15:
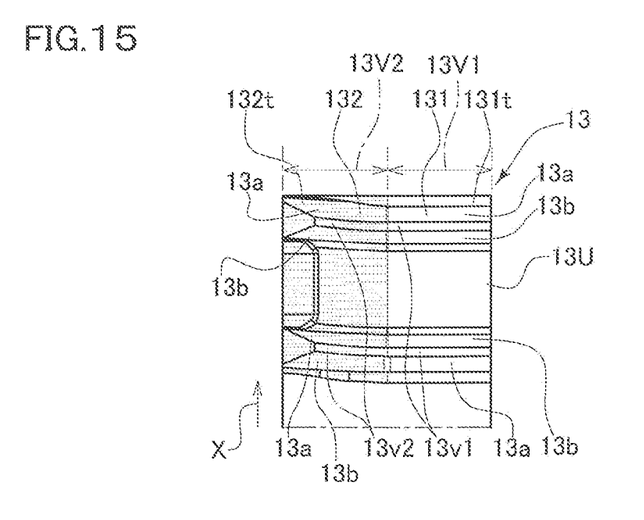
FIG. 15 is a side view of the inner periphery of the elastic locking piece similar to that in FIG. 11C, showing the clip in FIG. 14.

In the embodiment described above, as shown in FIG. 11C, each locking claw 13V (claw leading-edge 13V and faces 13a and 13b) has a helical shape with an inclined gradient such that the straight section 13V1 (claw leading-edge 13v1) is located on the second side in the axial direction in FIG. 9 (the upper side in FIG. 11C), and the edge 132t opposite to the straight section 13V1 is located on the first side in the axial direction (the lower side in FIG. 11C). However, as shown in FIGS. 14 and 15, each locking claw 13V may have a helical shape with an inclined gradient such that the straight section 13V1 (claw leading-edge 13v1) is located on the first side in the axial direction (the lower side in FIG. 15) and the edge 132t opposite to the straight section 13V1 is located on the second side in the axial direction (the upper side in FIG. 15). That is, where the stud bolt 31 is identical to that in the above embodiment, as shown in FIGS. 14 and 15, the straight section 13V1 (claw leading-edge 13v1) and helical section 13V2 (claw leading-edge 13v2) of the claw leading-edge 13v of each locking claw 13V may be arranged opposite to those in the configuration shown in FIG. 11C, in the direction in which they are juxtaposed to each other (the tangential direction described above).

In the embodiment described above, the elastic locking pieces 13 opposite to each other in the radial direction D may be arranged such that opposite claw leading-edges 13v of all the locking claws 13V in the opposite direction D are of the same type. That is, the straight sections 13V1 may be opposite to each other in the opposite direction D, and the helical sections 13V2 may be opposite to each other in the direction D in which the elastic locking pieces 13 are opposite to each other.

In each locking claw 13V in the embodiment above, the edge 132t of each helical section 13V2 extends (projects) longer than the edge 131t of each straight section 13V1 in the circumferential direction R around the axis of the insertion hole 19. However, as long as at least the helical claw portion 132 is formed along the screw groove 31V, the engagement section (contact section) is long. Therefore, the edge 132t does not have to be substantially extended in the circumferential direction R.

What is claimed is:

1. A clip comprising:
a tubular body part with an insertion hole; and
elastic locking pieces, wherein the elastic locking pieces are located on the inner peripheral surface of the insertion hole and on predetermined opposite areas with respect to an axis of the insertion hole, between the elastic locking pieces, wherein each elastic locking piece extends from a first side to a second side, which is opposite to the first side, in a direction of the axis such that a leading end of the elastic locking piece approaches the axis, and wherein each elastic locking piece is elastically deformable so that the leading end separates from the axis, each of the opposite elastic locking pieces having at the leading end a locking claw that is adapted to engage a helical screw groove on an outer peripheral surface of a screw member;
wherein each of the elastic locking pieces includes two or more composite locking claws, each of which has a straight claw portion in which a claw leading-edge extends straight in a direction orthogonal to the axis and a helical claw portion adapted to extend helically along the screw groove of the screw member so as to be continuous from the straight claw portion; and each of the elastic locking pieces includes a combination of the locking claws in which two of the straight claw portions and two of the helical claw portions alternate in the axial direction such that each elastic locking piece includes a combination of the composite locking claws that are different to each other in terms of the respective portions of the straight claw portion and the helical claw portion in the circumferential direction.

2. The clip according to claim 1, wherein each elastic locking piece has three or more composite locking claws, each elastic locking piece includes a combination of pairs of adjacent locking claws, in which pairs of adjacent locking claws are different in pitch between the adjacent claw leading-edges, and among the pairs of adjacent locking claws, a pair with a narrow pitch between the claw leading-edges is such that the locking claws are identical in terms of the position of the straight claw portion and helical claw portion in the circumferential direction; and, compared to this, a pair with a wide pitch between the claw leading-edges is such that the locking claws are opposite to each other in terms of the respective positions of the straight claw portion and helical claw portion.

3. The clip according to claim 2, wherein the pair of adjacent locking claws with the wide pitch between the respective claw leading-edges has a recess for accommodating two or more screw threads of the screw member.

4. The clip according to claim 1, wherein each elastic locking piece has two composite locking claws, the respective claw leading-edges having a recess for accommodating two or more screw threads of the screw member.

\* \* \* \* \*